Patented May 22, 1951

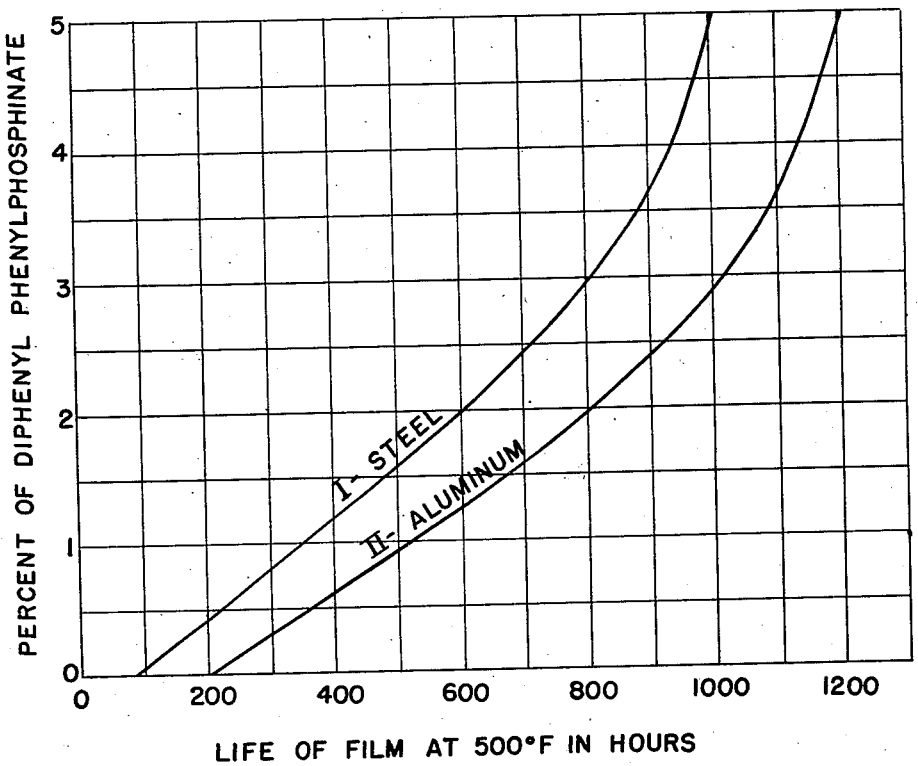

2,553,643

UNITED STATES PATENT OFFICE 2,553,643

POLYSILOXANE RESIN CONTAINING AN ARYL PHOSPHINIC ACID OR DIARYL ESTER THEREOF

Howard Ellerhorst, Jr., Cincinnati, Ohio, assignor to Interchemical Corporation, New York, N. Y., a corporation of Ohio Application December 2, 1947, Serial No. 789,318

8 Claims. (Cl. 260—45.7)

This invention relates to improved silicone resin compositions, and especially to silicone resin compositions comprising heat-hardenable silicone resin coating compositions.

Heat hardenable silicones, often referred to as heat hardenable polysiloxanes, generally are described as complex resinous substances containing free hydroxyl groups, resulting from the condensation of the hydrolysis products of mixtures of hydrocarbon substituted silicon halides in which the average number of hydrocarbon groups attached to silicon is more than 1 but less than 2, e. g. a mixture of methyl silicon trichloride and dimethyl silicon dihalide.

In the formation of polysiloxanes by the above described method it is presumed that the immediate hydrolysis products of the substituted silicon halides are the corresponding silicols in which hydroxyl groups have replaced the halogens. These silicols then condense by elimination of water between hydroxyl groups to give complex condensation products. By controlling conditions an intermediate condensation polymer is obtained. The intermediate condensation products are soluble in many of the common organic solvents and are heat-reactive, i. e. they tend to condense to higher molecular weight products and become insoluble when heated. This behavior of the intermediate silicone indicates that they still contain free hydroxyl groups.

The intermediate polysiloxane polymers, being soluble and heat-reactive, have been found to be of special value in protective and decorative coatings, especially on metals that are to be subjected to relatively high temperatures. Due to the high inorganic content of the polymers (i. e. silicon), cured films or coatings from such resins are more resistant to heat than the usual organic resin films. However, even with the silicone resin films, it is desirable to increase the age life of the films at high temperature. It is with this particular problem that the present invention is concerned.

I have discovered that the thermal age life of silicone resin films can be improved by the addition of from 2 to 5% by weight, based on silicone resins, of an organic phosphorous compound of the class consisting of aryl phosphinic acids and organic esters of phosphinic acids, to the coating composition from which the film is produced. Thermal age life as used herein refers to the length of time that the film retains its film properties under relatively high temperature conditions, e. g. 300-500° F. This improvement in age life is evidenced in particular by markedly increased endurance of the film without cracking, checking, or similar failure when exposed continuously or intermittently at elevated temperatures (i. e. 300-500° F.).

The effects of the phosphinic acid esters on the resin composition, although not understood completely, is believed to involve a chemical reaction between these additives and the hydroxyl groups of the uncured resin. This reaction is believed to take place during the curing of the film to result in a modified cured film having improved properties. The additives also may have some catalytic effect on the curing reaction. However, it should be understood that invention is not limited to any suggested theory as to how the desirable features of the invention are brought about.

In addition to increasing the age life of the cured resin film, other desirable results may, in certain instances, result from the use of the additives described in the present invention. For example, in many cases the films prepared from the compositions of invention will exhibit improved adhesion and shrinkage during high temperature aging.

The chemical structure of the phosphinic acids and esters that constitute the additives of the present invention appears to be somewhat in doubt according to the chemical literaure on the subject. Some references list the structure of a phosphinic acid as

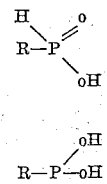

or

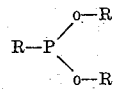

where R represents an hydrocarbon group or substituted hydrocarbon group. On the other hand, other references give the structure of esters of aryl phosphinic acids as $$R-P\diagup_{O-R}^{O-R}$$

where R represents an hydrocarbon radical or substituted hydrocarbon radical. The discrepancy of course makes no difference so far as the applicability of these acids and esters to the present invention is concerned. The additives are available in the market by their chemical names, e. g. phenyl phosphinic acid, diphenyl phenylphosphinate, and the like. The phosphinate esters can be prepared by reacting a dihalophosphine with an alcohol or a phenol. For example, diphenyl phenylphosphinate can be prepared by reacting $C_6H_5PCl_2$ with phenol.

Of the various phosphinic acids and esters, the ones especially desirable in the practice of the present invention are the aryl phosphinic acids and the aryl esters of these acids. Particular examples of such additives that are operable in the invention include phenylphosphinic acid, diphenyl phenylphosphinate, di-p-cresyl, phenylphosphinate acid, and di-p-chloro-phenyl phenylphosphinate.

Heat hardenable polysiloxane resins that are operable in the invention include all such resins that are regularly employed as heat-hardenable resins, as heat-hardenable methyl polysiloxane resins, and the ethyl, phenyl, methyl phenyl, methyl ethyl phenyl, etc. polysiloxane resins containing an average of more than 1 and less than 2 hydrocarbon groups per silicon atom.

Polysiloxane resin compositions containing the phosphinic acid or phosphinic ester additives of the present invention are prepared according to standard methods known to the art and, except for the additives that are to be added according to this invention, the compositions are similar to the compositions of the prior art. Protective and decorative coating compositions containing heat-hardenable polysiloxane resin generally contain, in addition to the resin, a suitable volatile solvent and a pigment. Other additives such as stabilizers, driers, extenders, etc., are often added, depending upon the particular application for which the composition is to be used. All such compositions are operable in the present invention.

Application of the improved compositions of the present invention to surfaces can be accomplished by any of the usual means known to the art, i. e. by brushing, roller coating, spraying, etc. Also the films from the novel composition are cured according to the usual methods, as by baking at 400° F. for one hour.

The phosphinic acids and their esters have been found to be particularly effective in increasing the age life of relatively high gloss polysiloxane films that are to be subjected to temperatures in the range of 300 to 500° F. Such films may be pigmented with pigments such as titanium dioxide.

The figure of the drawing shows graphically the effect of different percentages of diphenyl phenylphosphinate on the thermal age life of a coating film formed from a typical pigmented silicone resin enamel. The pigment was anatase titanium dioxide. Tests were carried out by coating strips of steel (curve 1) and aluminum (curve 2) with silicone enamels containing the various percentages of diphenyl phenylphosphinate, and measuring the age life of the cured films at 500° F. Failure of the film was recorded at the first visible sign of cracking, peeling, or checking. The experimental conditions were the same in each test except for the percentage of phosphinate additive present. The curves of the graph were obtained by plotting the age life against the percentage of additive. It is readily observable that there is a substantial increase in age life as the percentage of additive is increased up to about 5%. Increasing the percentage of additive above about 5% has little effect on age life and even has an adverse effect on such properties as marproofness, adhesion, etc. For this reason percentages of additive above about 5% are not desirable.

Having now described my invention and the manner in which it may be practiced, I claim as my invention:

1. A composition of matter comprising heat-hardenable hydrocarbon substituted polysiloxane resin, the average number of hydrocarbon groups attached to silicon atoms in said resin being more than one and less than two per silicon atom, and from 2 to 5% by weight, based on polysiloxane resin, of an organic phosphorus compound of the class consisting of mono-arylphosphinic acids, of empirical formula $RPO_2H_2$ and aryl esters of mono-arylphosphinic acids of empirical formula $R_3PO_2$ wherein R is an aryl group.

2. A composition of matter comprising heat-hardenable hydrocarbon substituted polysiloxane resin, the average number of hydrocarbon groups attached to silicon atoms in said resin being more than one and less than two per silicon atom, and from 2 to 5% by weight, based on polysiloxane resin, of phenylphosphinic acid, said acid having the empirical formula $$C_6H_5PO_2H_2$$

3. A composition of matter comprising heat-hardenable hydrocarbon substituted polysiloxane resin, the average number of hydrocarbon groups attached to silicon atoms in said resin being more than one and less than two per silicon atom, and from 2 to 5% by weight, based on polysiloxane resin, of an aryl ester of a mono-arylphosphinic acid, said ester having the empirical formula $R_3PO_2$ where R is an aryl radical.

4. A composition of matter comprising heat-hardenable hydrocarbon substituted polysiloxane resin, the average number of hydrocarbon groups atttached to silicon atoms in said resin being more than one and less than two per silicon atom, and from 2 to 5% by weight, based on polysiloxane resin, of diphenyl phenylphosphinate having the empirical formula $R_3PO_2$ where R is the phenyl radical.

5. A method of obtaining improved film properties in a cured polysiloxane resin film comprising curing a film containing heat-hardenable hydrocarbon substituted polysiloxane resin, the average number of hydrocarbon groups attached to silicon atoms in said resin being more than one and less than two per silicon atom, in the presence of from 2 to 5% of its weight of an organic phosphorus compound of the class consisting of monoarylphosphinic acids of empirical formula $RPO_2H_2$ and aryl esters of mono-arylphosphinic acids of the empirical formula $R_3PO_2$ wherein R is an aryl radical.

6. The method of obtaining improved film properties in a cured polysiloxane resin film comprising curing a film containing heat-hardenable hydrocarbon substituted polysiloxane resin, the average number of hydrocarbon groups attached to siilcon atoms in said resin being more than one and less than two per silicon atom, in the presence of from 2 to 5% of its weight of phenylphosphinic acid having the empirical fromula $C_6H_5PO_2H_2$.

7. The method of obtaining improved film properties in a cured polysiloxane resin film comprising curing a film containing heat-hardenable hydrocarbon substituted polysiloxane resin, the average number of hydrocarbon groups attached to silicon atoms in said resin being more than one and less than two per silicon atom, in the presence of from 2 to 5% of its weight of an aryl ester of a mono-arylphosphinic acid, said ester having the empirical formula $R_3PO_2$ where R is an aryl radical.

8. The method of obtaining improved film properties in a cured polysiloxane resin film comprising curing a film containing heat-hardenable hydrocarbon substituted polysiloxane resin, the average number of hydrocarbon groups attached to silicon atoms in said resin being more than one and less than two per silicon atom, in the presence of from 2 to 5% by weight of diphenyl phenylphosphinate having the empirical formula $R_3PO_2$ where R is the phenyl radical.

HOWARD ELLERHORST, JR.

REFERENCES CITED

The following references are of record in the file of this patent:

Chemical Abstracts, vol. 39, 1945, pp. 5939 to 5941.

Goddard, A Text Book of Inorganic Chemistry, vol. XI, part III, p. 107.

Whitmore, Organic Chemistry, 1937, p. 208.